United States Patent
Svarre et al.

(10) Patent No.: US 10,502,223 B2
(45) Date of Patent: Dec. 10, 2019

(54) CENTRIFUGAL PUMP

(71) Applicant: GRUNDFOS HOLDING A/S, Bjerringbro (DK)

(72) Inventors: Erik Bundesen Svarre, Bjerringbro (DK); John Frigård Nielsen, Fårup (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 219 days.

(21) Appl. No.: 15/415,024

(22) Filed: Jan. 25, 2017

(65) Prior Publication Data
US 2017/0211581 A1    Jul. 27, 2017

(30) Foreign Application Priority Data
Jan. 26, 2016  (EP) .................................... 16152769

(51) Int. Cl.
*F04D 29/12* (2006.01)
*F04D 1/06* (2006.01)
(Continued)

(52) U.S. Cl.
CPC ............. *F04D 29/126* (2013.01); *F04D 1/06* (2013.01); *F04D 13/06* (2013.01); *F04D 17/08* (2013.01); *F04D 25/06* (2013.01); *F04D 29/043* (2013.01); *F04D 29/0416* (2013.01); *F04D 29/053* (2013.01); *F04D 29/122* (2013.01); *F04D 29/22* (2013.01); *F04D 29/28* (2013.01); *F04D 29/4206* (2013.01); *F04D 29/426* (2013.01); *F16J 15/34* (2013.01)

(58) Field of Classification Search
CPC ........ F04D 29/10; F04D 29/12; F04D 29/167; F04D 29/126; F04D 29/122; F04D 29/043; F04D 29/053; F04D 29/0416; F04D 29/23; F04D 29/28; F04D 29/4206; F04D 29/426; F04D 29/08; F04D 29/083; F04D 29/086; F04D 29/106; F04D 17/08; F16J 15/3464
USPC .................................................. 277/387, 367
See application file for complete search history.

(56) References Cited

U.S. PATENT DOCUMENTS 1,927,543 A * 9/1933 Doyle ................... F04D 29/126
                                                              277/387
3,068,801 A * 12/1962 Murray ................. F04D 29/146
                                                              277/387
(Continued)

FOREIGN PATENT DOCUMENTS

NL          7 712 699 A        5/1979
WO       2014/187648 A1     11/2014

*Primary Examiner* — George C Jin
(74) *Attorney, Agent, or Firm* — McGlew and Tuttle, P.C.

(57) ABSTRACT

A multi-stage centrifugal pump includes pump stages (6), with impellers (13) arranged on a rotatable shaft (12) arranged within a pump casing. The shaft passes through a chamber (8), provided within the pump casing, and is sealingly led out of the pump casing for connection to a drive motor (11). A shaft ring (22) is fixedly and sealingly connected to the shaft (12) and has one side, at least in sections, that is subjected to the pressure of the pump and is arranged in or on the shaft. An axial seal (19) is provided with a rotating part formed by the shaft ring (22) or a seal part (23) arranged thereon and with a non-rotating part formed by a counter-ring (24) or a seal part which is arranged thereon. The counter-ring (24) is radially sealed with respect to the chamber (18) and is axially movably guided within the chamber.

20 Claims, 4 Drawing Sheets

(51) Int. Cl.
*F04D 13/06* (2006.01)
*F04D 17/08* (2006.01)
*F04D 25/06* (2006.01)
*F04D 29/043* (2006.01)
*F04D 29/053* (2006.01)
*F04D 29/22* (2006.01)
*F04D 29/28* (2006.01)
*F04D 29/42* (2006.01)
*F04D 29/041* (2006.01)
*F16J 15/34* (2006.01)

(56) References Cited

U.S. PATENT DOCUMENTS

| | | | | |
|---|---|---|---|---|
| 4,342,538 A | * | 8/1982 | Wolford | F16J 15/36 |
| | | | | 277/392 |
| 4,700,953 A | * | 10/1987 | Kuusela | F16J 15/3468 |
| | | | | 277/370 |
| 6,287,074 B1 | * | 9/2001 | Chancellor | F04D 13/0646 |
| | | | | 415/111 |
| 2005/0232794 A1 | * | 10/2005 | Scharffenberger | |
| | | | | F04D 29/0413 |
| | | | | 417/423.12 |
| 2008/0008577 A1 | * | 1/2008 | Cohen | F04D 7/045 |
| | | | | 415/121.1 |

* cited by examiner

Fig.1
Fig.2
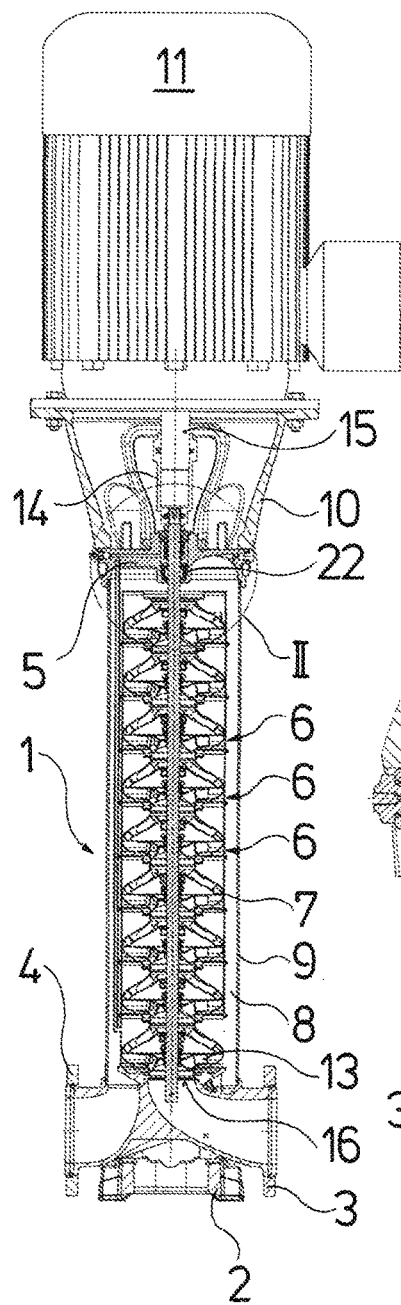
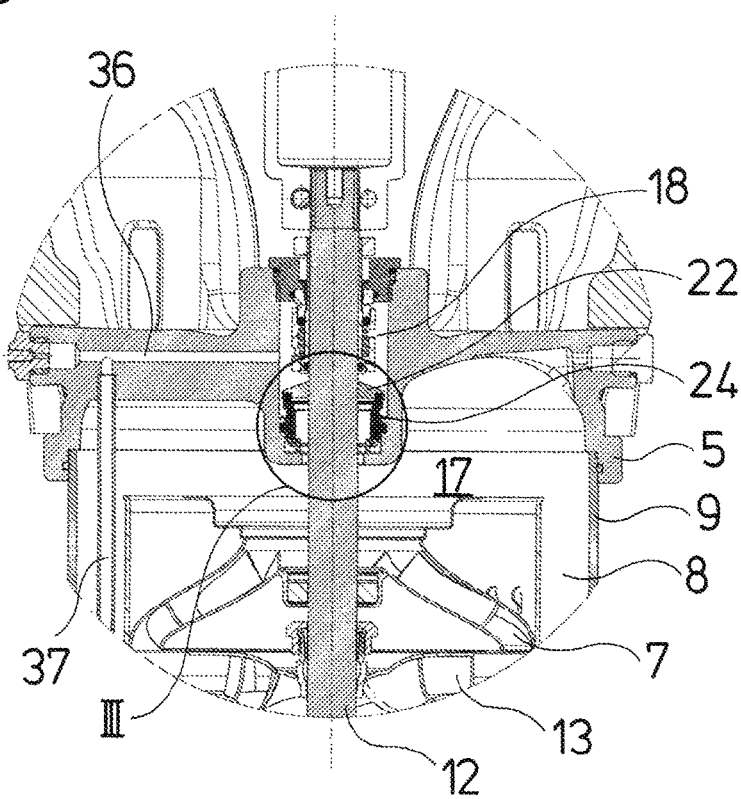

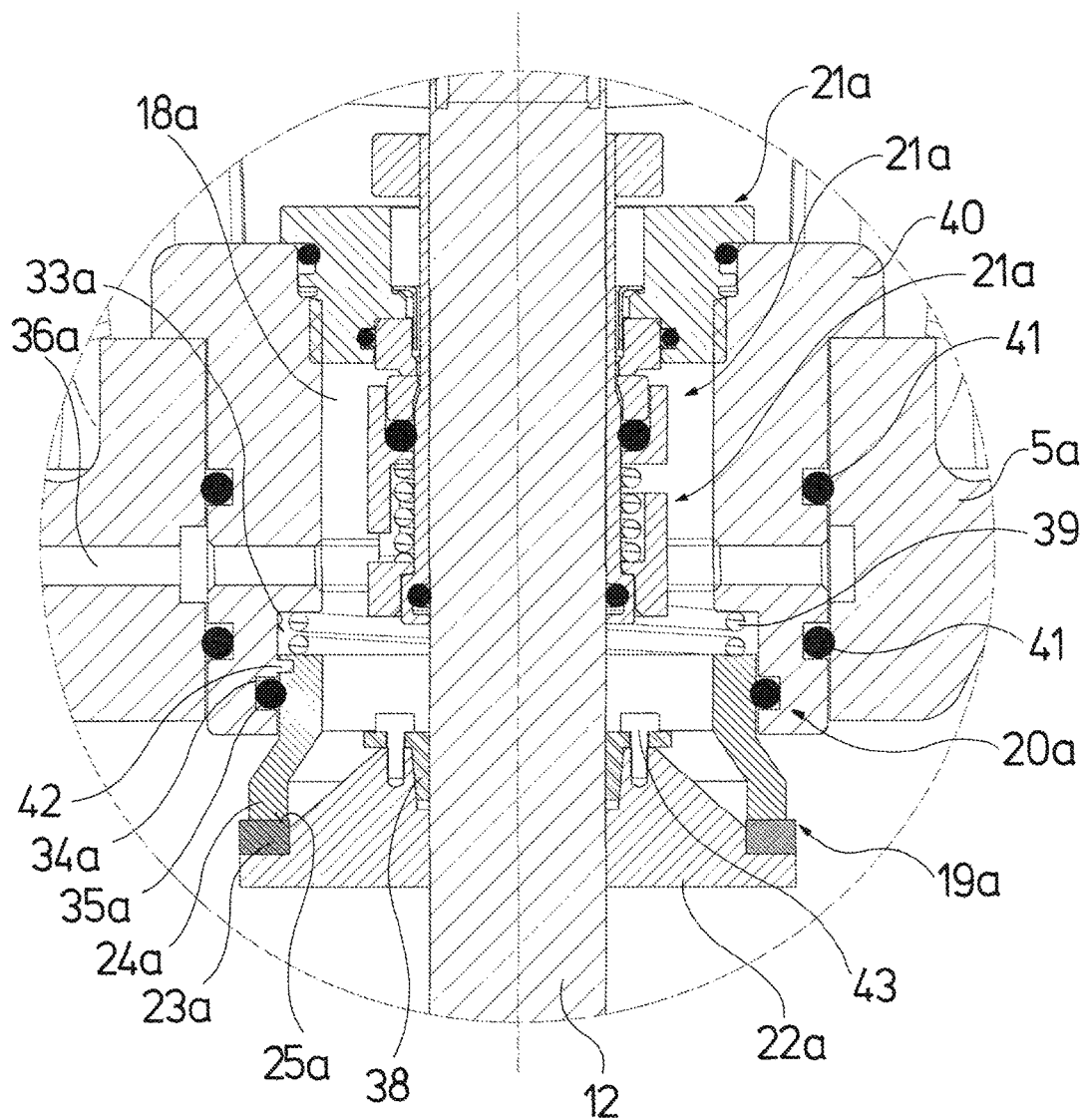

CENTRIFUGAL PUMP

CROSS REFERENCE TO RELATED APPLICATIONS

This application claims the benefit of priority under 35 U.S.C. § 119 of European Application 16 152 769.2 filed Jan. 26, 2016, the entire contents of which are incorporated herein by reference.

FIELD OF THE INVENTION

The invention relates to a multi-stage centrifugal pump with impellers arranged on a shaft which is rotatably arranged within a pump casing and at one end is sealingly led out of the pump casing for connection to a drive motor.

BACKGROUND OF THE INVENTION

Centrifugal pumps of this type and in different variants are counted as belonging to the state of the art, and Grundfos pumps of the CR series are referred to in this context. These pumps are operated with a vertically arranged shaft. Thereby, the pump stages are clamped between a foot apart and a head part and are provided with a jacket which surrounds these and which together with the diffusers arranged over one another form an annular channel, via which the fluid which is delivered upwards from the suction port at the lower side of the lowermost impeller through the pump stages, is led back to the delivery connection of the pump. A shaft carrying the impellers passes through the head part of the pump, and there is sealed by way of a mechanical shaft seal integrated in the manner of a cartridge. The shaft end which is led out there at the pump head is connected to the shaft end of an electrical drive motor in a rotationally fixed manner, said drive motor being fastened via a motor stool arranged on the pump head part.

Inherent of the design, considerable forces also act upon the pump shaft in the axial direction, and these must be accommodated by the bearings of the pump or the motor. These forces are essentially created hydraulically. Thus, with the Grundfos pump CR90 for example, axially downwardly directed forces of the magnitude of 900 Newton act at a delivery output of 120 m$^3$ per second, and these forces are to be accommodated by the bearings of the 45 KW motor, by which means a loading of the bearings is given, and this must be taken into account with the design or entails a high wearing of the bearings.

SUMMARY OF THE INVENTION

Against this background, it is an object of the invention, to configure a multistage centrifugal pump of the generic type, such that the loading of the motor-side bearings due to axial forces acting upon the pump shaft is reduced.

According to the invention, a multistage centrifugal pump is provided comprising a shaft, on which the impellers—also called pump wheels—of pump stages are seated and which is rotatably arranged within a pump casing. One end of this shaft is sealingly led out of the pump casing for connection to a drive motor. A chamber, through which the shaft passes and in which or on which a shaft ring which is fixedly and sealingly connected to the shaft and whose one side at least in sections is subjected to the pressure of the pump (delivery pressure), is arranged within the pump casing. An axial seal is provided, whose rotating part is formed by the shaft ring or a seal part which is arranged thereon and whose non-rotating part is formed by a counter-ring or a seal part which is arranged thereon. Thereby, the counter-ring is sealed off radially with respect to the chamber and is led within the chamber in an axially movable manner.

A basic concept of the solution according to the invention is to create a hydraulic axial force relief of the shaft, in order in this manner to reduce the loading of the thrust bearing, be it on the pump side and/or motor side. This hydraulic force compensation according to the invention is combined with a mechanical shaft seal which is thereby advantageously designed such that the mechanical shaft seal itself is configured as a purely axial seal, whereas the necessary radial seal is only provided between a non-rotating part of the axial seal and the chamber, thus a part of the pump casing. This radial seal merely needs to accommodate the axial movement of the non-rotating part of the axial seal, thus is dynamically loaded only to a small extent, which is why as a rule an O-ring or a comparable static seal is sufficient. The actual sealing of the shaft between the chamber and the surroundings is effected in the manner known per se, for example by way of a sealing cartridge with an integrated mechanical shaft seal or other seal, with the significant advance compared to the state of the art, that here the pressure level, specifically the difference between the pressure in the chamber on the one hand and the surrounding pressure on the other hand, is comparatively low and, inasmuch as this is concerned, an inexpensive seal can be installed, which ensures a high sealedness with only a low friction.

The solution according to the invention thus comprises design aspects which here interact in a particularly advantageous manner. The shaft ring which is sealingly and fixedly connected to the shaft, to one side is subjected to the pressure of the pump, which is to say preferably to the pressure of the last pump stage, thus to the delivery pressure of the pump, by which means the desired force compensation is achieved. It is to be understood that the shaft ring is to be configured accordingly with regard to area/surface. The surface of the shaft ring must be sealed to the other side of the shaft ring, in order to design this surface in a pressure-effective manner, and this is advantageously effected by an axial mechanical shaft seal. Finally, the non-rotating part of the axial mechanical shaft seal is movably mounted on a chamber wall in the axis direction, wherein this region can be sealed off by a seal which is simple with regard to design, for example an O-ring, since this seal needs only to accommodate the slight axial movement, but not the movement between the rotating and non-rotating parts. Finally, a closed of space having a significantly lower pressure level than the pressure chamber is created by the chamber which is arranged within the pump casing and which advantageously to the outside is provided with a further seal between the shaft and the pump casing and is thus sealed to the outside. The chamber is therefore advantageously sealed to the outside once again, so that the fluid which in particular on starting the pump penetrates through the not yet set sealing gap into this chamber, can be led away within the pump without getting to the outside. Moreover, a quasi infinite pressure level between the suction-side and the delivery-side pressure of the pump can be set within the chamber, which on the one hand suits the dimensioning of the shaft ring or the pressure-effective surface of this shaft ring and on the other hand permits the leading-back of the fluid getting into the chamber.

According to an advantageous further development of the invention, the chamber to one side of the axial seal is channel-connected to a suction side of a pump stage. It is to be understood that it is hereby the side of the axial seal which is not subjected to the delivery pressure of the pump. Thereby, it has been found to be particularly advantageous if the chamber is channel-connected to the suction side of the second pump stage. This has the advantage that on the one hand leakages can be reliably prevented, since the leading-back of the fluid getting into the chamber reliably prevents this being able to go through the outer seal between the shaft and the pump casing. Moreover, the chamber itself can be subjected to a certain inner pressure by way of such a channel connection, in particular if it is connected to the pressure level between two pump stages, by which means the mechanical shaft seal is relieved of pressure to a certain extent. The dimensioning of the shaft ring and the hydraulic counter-force upon the shaft and which is caused by this can also be set in a suitable manner. The dimensioning of the shaft ring and the mechanical shaft seal are thus no longer exclusively dependent on the pressure (delivery pressure) of the pump.

If the shaft ring is arranged within the chamber, the previously mentioned effect is then achieved by way of the chamber to the other side of the shaft ring being channel-connected to a suction side of a pump stage. In this case, a part of the chamber, specifically the part to a side of a shaft ring, is still subjected to the pump pressure (delivery pressure).

According to an advantageous design of the invention, the axial seal is arranged on the side of the shaft ring which faces the impellers. With this arrangement, the shaft ring is arranged within the chamber and separates the pressure level within the chamber. With this design, it is advantageous if the chamber comprises a cylindrical inner wall section which serves for the radial sealing of the counter-ring, thus forms the region, in which the counter-ring is axially movably guided. The chamber at one side is then hydraulically connected to the pressure chamber of the last pump stage, and on the other side it comprises a shaft feedthrough to outside the pump casing, wherein this feed-through is likewise configured in a sealed manner.

If, as can be advantageous, the axial seal is arranged at the side of the shaft ring which is away from the impellers, the shaft ring then delimits the chambers to the pump space, is thus arranged on the chamber and not in the chamber. With the latter arrangement, it is advantageous if the non-rotating part of the axial seal is subjected to spring force in the direction of the shaft ring, in order to ensure the necessary pressing force of the mechanical shaft seal, wherein this pressing force is hydraulically mustered with another embodiment which is yet described in more detail further below.

The shaft feed-through to outside the pump casing, thus in the region of the chamber to the outside, is advantageously sealed off by a sealing unit which is preferably configured as a mechanical shaft seal cartridge and is integrated in a face wall of the chamber. Thereby, it can be the case of a sealing unit, be applied similarly to the manner of the state of the art and be exchangeable from the outside, thus without having to remove the shaft from the pump. This seal can be dimensioned in a simpler manner, since the pressure level between the chamber and the surroundings is significantly less that the pressure level between the pressure of the last pump stage, thus the delivery pressure of the pump, and the chamber.

The centrifugal pump itself is advantageously configured such that the pump casing comprises a head part and a foot part, between which the pump stages are clamped, wherein the chamber is advantageously arranged in the head part, where the shaft feed-through to the outside also lies. With regard to the centrifugal pump, it is advantageously the case of an inline pump which is operated with a vertical shaft, whose suction and delivery connection are arranged on the foot part side, and with which an annular channel surrounding the pump stages is formed, said annular channel leading the delivery fluid from a pressure chamber at the exit of the last pump stage, from the head part back into the foot part to the delivery connection. Thereby, the chamber with its one side is arranged adjacent the pressure chamber of the last pump stage.

According to an advantageous further development of the invention, the shaft ring itself can form a part of the axial seal, if on an axial side it comprises an annular surface forming a rotating sealing surface of the axial seal. Alternatively, the shaft ring can be provided with an axial sealing ring, whose one face side forms a rotating sealing surface of the axial seal. Such an axial sealing ring can advantageously be exchanged, for example be integrated in a groove in the face side of the shaft ring. This design has the advantage that only the axial sealing ring itself needs to be manufactured of a highly wear-resistant material, for example silicon carbide, whereas the shaft ring which is significantly greater with regard to volume can consist of less expensive material. Accordingly, the counter-ring can be configured such that either it itself comprises an axial side which forms a non-rotating sealing surface of the axial seal or is provided with a preferably exchangeable axial sealing ring whose one face side forms a non-rotating sealing surface of the axial seal.

The radial seal between the counter-ring and the chamber can advantageously be formed by an O-ring which can be assembled in an inexpensive and simple manner. Advantageously, the O-ring lies in a groove of the chamber wall, but a peripheral groove can also be provided in the outer periphery of the counter-ring, in order to hold the O-ring in its position.

A greater friction arises in the axial seal, in particular on starting operation, when a quasi stationary condition has not yet set in. In order here to prevent the non-rotating part of the seal being set into rotation, according to an advantageous further development of the invention, a rotational lock is provided, and specifically advantageously between the counter-ring and the chamber. Such a rotation lock can advantageously be formed by a sheet-metal section which is positively connected in a rotationally fixed manner to the chamber wall and to the counter-ring, but is axially displaceably arranged within the chamber, so that it can follow the axial movements of the counter-ring.

Such a sheet-metal section can be advantageously be configured in an annular manner such that in its outer region it bears on a face side or a shoulder in the counter-ring, and at its inner side surrounds the shaft at a small distance. Thereby, the dimensioning of the gap or other openings between the sheet-metal section and the shaft or the counter-ring is selected such that on starting operation of the pump, thus with the pressure build-up, firstly the sheet-metal section and thus the counter-ring bearing thereon is axially displaced by pressure impingement, until the sealing surfaces of the axial seal bear on one another. The counter-ring further is otherwise configured such that an axial force subjecting the counter-ring to force toward the shaft ring is always produced, which is to say also when the axial sealing surfaces bear on one another due to the greater pressure prevailing at one side.

The invention is hereinafter explained in more detail by way of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a greatly simplified longitudinal sectioned representation of a multi-stage centrifugal pump according to the invention, with a connected electric motor;

FIG. 2 is a detail II in FIG. 1, in an enlarged representation;

FIG. 5 is a representation according to FIG. 3 of a further embodiment according to the invention.

DESCRIPTION OF THE PREFERRED EMBODIMENTS

Figure 3:
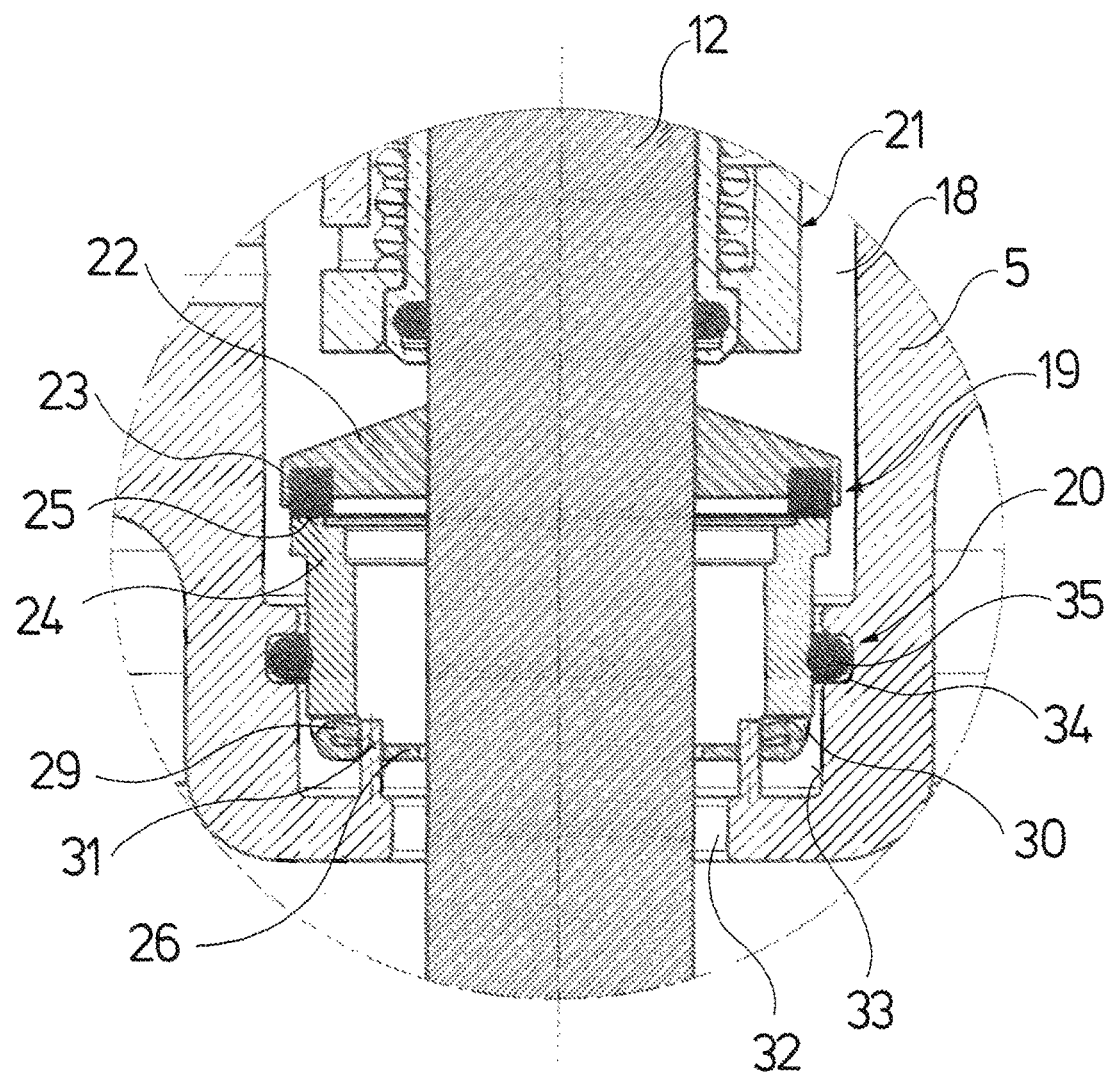
FIG. 3 is a detail III of FIG. 2, in an enlarged representation.
Figure 4:
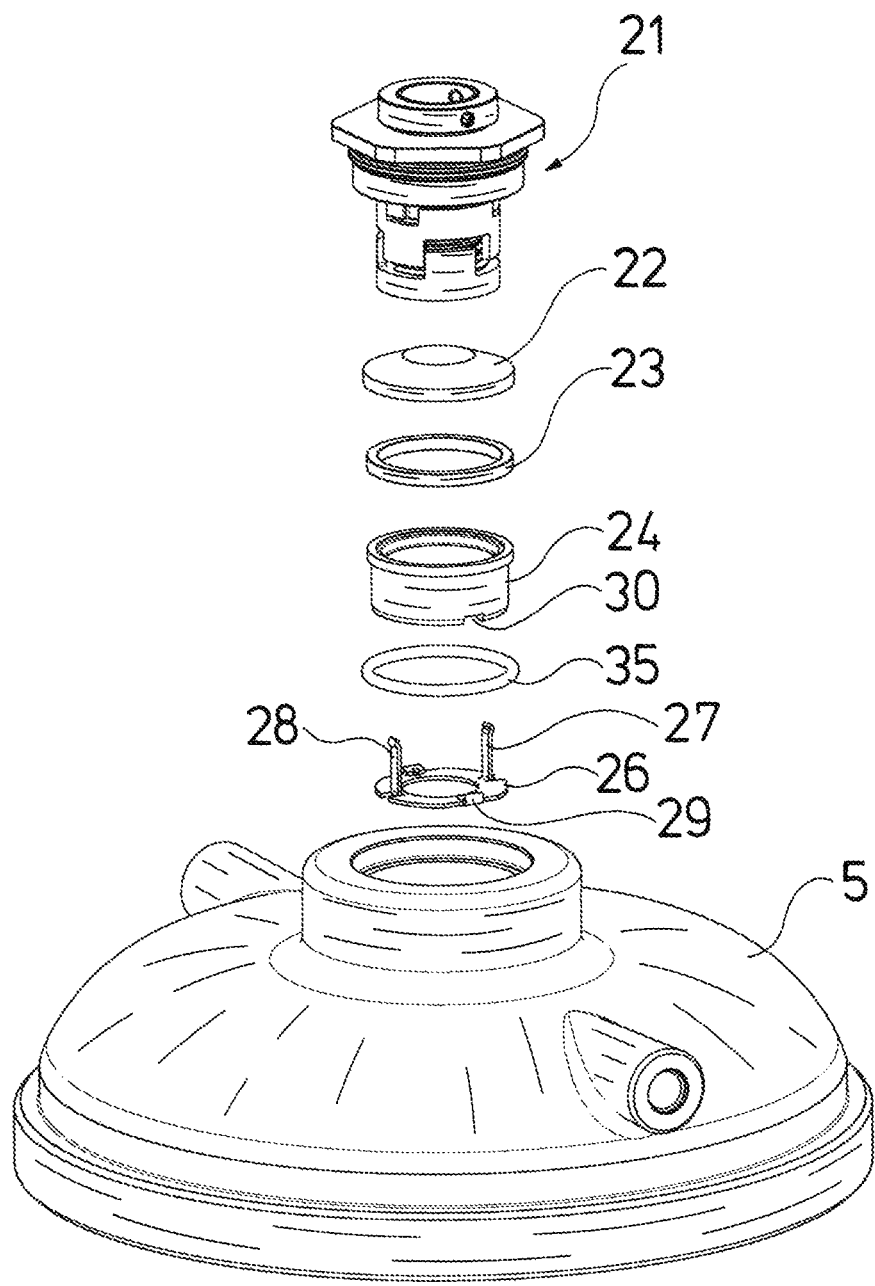
FIG. 4 an exploded representation of the head part of the pump with seals.

Referring to the drawings, the centrifugal pump represented in FIG. 1 is a multi-stage inline centrifugal pump 1, with a foot part 2, on which the pump stands and which comprises a suction connection 3 as well as a delivery connection 4 which lies on the same axis as this. The centrifugal pump 1 is closed to the top by a head part 5. The pump stages 6 whose diffusers 7 form the inner wall of an annular channel 8 whose outer wall is formed by a tube section 9 likewise clamped between the head part 5 and the foot part 2 are arranged between the head part 5 and the foot part 2. The head part and the foot part here are connected to one another by way of tie rods which are not represented here. A motor stool 10 which carries a drive motor in the form of an electric motor 11 connects to the head part 5 to the top.

The centrifugal pump 1 comprises a central shaft 12 which stands in an upright manner, which means is arranged vertically and carries impellers 13 of the individual pump stages 6. The shaft 12 is sealingly led through the head part 5 of the pump 1, and in the region of the motor stool 10 is coupled to the shaft of the motor 11 in a rotationally fixed manner via a coupling 14.

On operation, the delivery fluid goes through the suction connection 3 to the suction port 16 of the first pump stage 6 and from there upwards form the stage 6 to stage 6 amid the increase of pressure, up to the exit of the last pump stage, thus into the pressure chamber 17. From there, the fluid goes via the annular channel 8 back into the foot part 2 and from there to the delivery connection 4, where the delivery fluid exits.

A chamber 18, through which the pump shaft 12 passes, is provided in the head part 5, wherein with the embodiment according to FIGS. 1 to 4, the lower part of the chamber 18 is channel-connected to the pressure chamber 17 and via a seal consisting of an axial seal 19 and a radial seal 20 is separated from the remaining chamber 18. A further seal 21 seals the chamber to the top, in the region between the exiting of the shaft 12 out of the head part 5 of the pump casing, with respect to the pump casing. With regard to this seal, it is the case of a sealing unit as is counted as belonging to the state of the art and is applied with Grundfos CR pumps, which are referred to inasmuch as this is concerned.

A shaft ring 22 is arranged on the shaft 12 in a sealed and fixed manner, in the lower region of the chamber 18. This shaft ring 22 is connected in a fixed and sealed manner to the shaft 12 of the pump 1, by way of bonding, welding or shrinking. A peripheral groove, in which a sealing ring 23 consisting of silicon carbide is arranged, is recessed in the shaft ring 22, in the flat side which faces the impellers 13. This sealing ring 23 forms the rotating seal part of the axial seal 19. The non-rotating seal part is formed by a counter-ring 24 which has an essentially cylindrical shape and whose face side directed to the shaft ring 22 forms the counter-sealing surface 25 which sealingly bears on the sealing ring 23 on operation and together with this forms the axial seal 19. The counter-ring 24 is configured open to the bottom and at its lower side is provided with a ring 26 which is formed from sheet-metal and which comprises diametrically opposite arms 27 which project upwards out of the base surface of the ring. These arms with their radially outwardly projecting ends 28 engage into a shoulder of the cylindrical inner side of the counter-ring 24, said shoulder being widened to the outside, and form a fastening. Prominences 29 which engage into corresponding recesses 30 on the lower face side of the counter-ring 24 and thus secure the sheet-metal ring 26 in a rotational fixed manner to the counter-ring 24 are formed on the upper side, in each case in a manner offset by 90, a to the arms 27. Opposite the pump casing, the sheet metal ring 26 lies in a rotationally fixed manner in corresponding projections 31 on the base of the chamber 18. The sheetmetal ring 26 largely closes the free space which is formed between the counter-ring 24 and the shaft 12, as a result of which the delivery fluid which arises in the pressure chamber 17 at a high pressure on running up the pump gets through the gap 32 between the chamber base and the shaft 12 and firstly is present at the sheet metal ring 26. The pressure which is present on the ring 26 ensures that this axially displaces the counter-ring 24 until this bears on the sealing ring 23, due to the fact the gap between the sheet metal ring 26 and the shaft 12 is significantly smaller than the gap 32. Only then can a pressure slowly build up also within the counter-ring 24, thus in the space between the counter-ring 24 and the shaft 12. The axially pressure-effective inner surface of the counter-ring is smaller than the outer surface, on which the delivery pressure of the pressure chamber 17 prevails, in the stationary, pressure-compensated operating condition, so that the counter-ring is subjected to force in the axial direction to the shaft ring 22 and is thus hydraulically held in its sealing position.

The counter-ring 24 is non-rotating and is held in a rotationally fixed manner to the pump casing by way of the projections 31 in combination with the sheet metal ring 26. It is axially displaceably mounted within the chamber 18, and for this the chamber comprises a cylindrical section 33, in which a peripheral groove 34 is provided, in which peripheral groove an O-ring 35 sealing the chamber wall with respect to the counter-ring 24 is integrated. This radial seal 25 (O-ring seal) is sufficient in order to seal off the pressure prevailing the pressure chamber 17 with respect to the chamber 18, since the counter-ring 24 axially moves only initially, but is otherwise arranged quasi stationary with respect to the chamber 18.

As is particularly evident from FIG. 3, the shaft ring 22 comprises an annular surface between the sealing ring 23 and the shaft 22, and this is dimensioned such that the pressure force which arises there at least partly downwardly compensates the force acting upon the shaft 12 on operation.

The chamber 18 is sealed to the pressure chamber 17 by the seals 19 and 20 and to the outside by the sealing unit 21.

A channel 36 which firstly extends radially outwards from the chamber 18 through the head part 5 and is sealingly closed at the end side is provided, in order to lead away fluid possibly getting into the chamber 18 on the other side of the seals 19 and 20. A pipe 37 which connects the channel 36 to the exit of the first pump stage 6 connects transversely to this channel 36, so that the fluid which is led back via the channel 36 and the pipe 37 is led back again into the delivery path. The chamber 18 is always subjected to the pressure level at the exit of the first pump stage 6, thus to a pressure which is significantly lower than the pressure prevailing in the pressure chamber 17 at the end of the last pump stage 6, but which is greater than the ambient pressure, due to the fact that the connection runs out between the first and the second pump stage. The pressure which prevails in the chamber 18 can be set in a quasi infinite manner with regard to design, depending on the location of the run-out of the pipe 37. The differential pressure which arises on the shaft ring 22 and thus also the compensation force which is hydraulically produced by the shaft ring results by way of this.

An embodiment variant which corresponds to the representation according to FIG. 2, but with which the shaft ring 22a is not arranged within the chamber 18a but on the chamber 18a and quasi forms the base-side chamber wall is represented by way of FIG. 5. The functionally equal components with regard to the described embodiment in FIG. 5 are provided with the same reference numerals but with the addition "a".

The shaft ring 22a is fastened on the shaft 12 by way of a conical clamping ring 38, and this clamping ring 38 is pressed via screws 43 in a corresponding conical recess on the inner side of the shaft ring 22a and holds the shaft ring 22a on the shaft in a sealed and fixed manner. Different to that with the above described embodiment, the shaft ring 22a comprises a sealing ring 23a which is arranged on the side of the shaft ring 22a which is away from the impellers 13. A counter-ring 24a bears with its counter-sealing surface 25a directed downwards, on the sealing ring 23a in a sealing manner.

The counter-ring 24a is guided in a cylindrical section 33a of the chamber 18a in an axially movable manner and is radially sealed off via an O-ring 35a which lies in a groove 34a. The O-ring 35a forms the radial seal 20a, whereas the sealing ring 23a and the counter-ring 24a with the countersealing surface 25a form the axial seal 19a. Since with this embodiment, the chambers 18a are sealed to the bottom by the shaft ring 22a and the counter-ring 24a, the pressure of the pressure chamber 17 is only present at the outside on the shaft ring 22a and on the counter-ring 24a, and the chamber 18a everywhere has the same pressure level which is determined by the connection via the channels 36a and 37 (37 is not visible in FIG. 5). A helical spring 39 which is supported on an inwardly projecting shoulder in the chamber wall is provided for producing the necessary axial pressing force of the counter-ring 24 with its counter sealing surface 25a, since the counter-ring 24a here is not subjected to the pressure of the pressure chamber 17. The chamber wall here is not radially formed directly by the head part 5, but by a sleeve 40 which is integrated there, is screw-fastened in a recess of the head part 5 and is sealed with respect to the channel 36 or the corresponding openings in the sleeve 40 by way of two O-rings 41. With this embodiment too, a rotational lock 42 is provided, which ensures that the counter-ring 24a is arranged within the sleeve 40 in a rotationally fixed manner.

While specific embodiments of the invention have been shown and described in detail to illustrate the application of the principles of the invention, it will be understood that the invention may be embodied otherwise without departing from such principles.

APPENDIX

List of Reference Numerals 1 centrifugal pump
2 foot part
3 suction connection
4 delivery connection
5 head part
6 pump stages
7 diffuser
8 annular channel
9 pipe section
10 motor base
11 electric motor
12 shaft of the pump
13 impeller/pump wheel
14 coupling
15 shaft of the motor
16 suction port of the first pump stage
17 pressure chamber
18, 18a chamber
19, 19a axial seal
20, 20a radial seal
21, 21a sealing unit
22, 22a shaft ring
23, 23a sealing ring
24, 24a counter-ring
25, 25a counter-sealing surface
26 sheet metal ring
27 arms
28 ends of the arms
29 prominences
30 recesses
31 projections
32 gap
33, 33a cylindrical section of 18
34, 34a groove
35, 35a O-ring
36, 36a channel
37 pipe
38 clamping ring
39 screws
40 sleeve
41 O-rings
42 rotation lock
43 screws

What is claimed is:

1. A multi-stage centrifugal pump comprising:
a pump casing;
a shaft;
impellers of pump stages arranged on the shaft rotatably within the pump casing, the shaft at one end being sealingly led out of the pump casing for connection to a drive motor, the pump casing having a chamber, provided within the pump casing, through which the shaft passes;
a shaft ring fixedly and sealingly connected to the shaft and arranged on the shaft, the shaft ring having one side, which, at least in sections, is subjected to a pressure of the pump;
an axial seal comprising a rotating part formed by the shaft ring or a seal part arranged on the shaft ring and comprising a non-rotating part formed by a counter-ring or a seal part which is arranged on the counter-ring, and wherein the counter-ring is radially sealed with respect to the chamber and is axially movably guided within the chamber;

an annular sheet-metal section comprising an outer region and an inner side, the outer region bearing on one of a face side of the counter-ring and a shoulder of the counter-ring, the inner side surrounding the shaft at a spaced location from the shaft, wherein a dimension of a gap or openings between the sheet-metal section and the shaft or the counter-ring is such that on starting operation of the pump, the sheet-metal section and the counter-ring bearing on the sheet-metal section are axially displaced by pressure in the pump until sealing surfaces of the axial seal bear on one another.

2. A centrifugal pump according to claim 1, wherein the axial seal is provided in the chamber and the chamber, on a side of the axial seal, is channel-connected to a suction side of a pump stage, preferably of a second pump stage.

3. A centrifugal pump according to claim 1, wherein the shaft ring is provided in the chamber and the chamber, on one side of the shaft ring, is channel connected to a suction side of a pump stage.

4. A centrifugal pump according to claim 1, wherein the axial seal is arranged on a side of the shaft ring which faces the impellers.

5. A centrifugal pump according to claim 1, wherein the chamber comprises a cylindrical inner wall section for the radial sealing that, at one side, is hydraulically connected to a pressure chamber of a last pump stage and at another side comprises a shaft feed-through to outside the pump casing.

6. A centrifugal pump according to claim 1, wherein the axial seal is arranged at a side of the shaft ring which is away from the impellers, and the shaft ring delimits the chamber with respect to the pressure chamber.

7. A centrifugal pump according to claim 1, wherein the shaft feed-through to outside the pump casing comprises a sealing unit comprised of a mechanical shaft seal unit which is integrated into a face wall of the chamber.

8. A centrifugal pump according to claim 1, wherein the pump casing comprises a head part and a foot part, between which the pump stages are clamped and that the chamber is arranged in the head part.

9. A centrifugal pump according to claim 8, wherein:
the centrifugal pump comprises an inline pump which is operated with the shaft as a vertical shaft;
a suction and a delivery connection are arranged on the foot part side and with which an annular channel is formed, said annular channel surrounding the pump stages and leading the delivery fluid from a pressure chamber at an exit of a last pump stage, from the head part back into the foot part to the delivery connection; and
the chamber has one side that is adjacent to the pressure chamber.

10. A centrifugal pump according to claim 1, wherein the shaft ring has an axial side that comprises an annular surface which forms a rotating sealing surface of the axial seal.

11. A centrifugal pump according to claim 1, wherein the shaft ring is provided with an exchangeable axial sealing ring with one face side forming a rotating sealing surface of the axial seal.

12. A centrifugal pump according to claim 1, wherein the counter-ring comprises an axial side which forms a non-rotating sealing surface of the axial seal.

13. A centrifugal pump according to claim 1, wherein the counter-ring is provided with an exchangeable axial sealing ring, with one face side forming a non-rotating sealing surface of the axial seal.

14. A centrifugal pump according to claim 1, wherein an O-ring is integrated between the counter-ring and the chamber, in a peripheral groove in a chamber wall of the chamber.

15. A centrifugal pump according to claim 1, wherein a rotation lock is provided between the counter-ring and the chamber.

16. A centrifugal pump according to claim 1, wherein the pump casing comprises at least one pump casing projection, the annular sheet metal section being movably mounted to the at least one pump casing projection such that the annular sheet metal section is movable relative to the at least one pump casing projection via the pressure in the pump.

17. A multi-stage centrifugal pump comprising:
a pump casing;
a shaft comprising a shaft longitudinal axis;
impellers of pump stages arranged on the shaft rotatably within the pump casing, the shaft at one end being sealingly led out of the pump casing for connection to a drive motor, the pump casing having a chamber, provided within the pump casing, through which the shaft passes;
a shaft ring fixedly and sealingly connected to the shaft and arranged on the shaft, the shaft ring having one side, which, at least in sections, is subjected to a pressure of the pump;
an axial seal comprising a rotating part formed by the shaft ring or a seal part arranged on the shaft ring and comprising a non-rotating part formed by a counter-ring or a seal part which is arranged on the counter-ring, wherein the counter-ring is radially sealed with respect to the chamber and the counter-ring is axially movably guided within the chamber, the counter-ring comprising a counter-ring outer surface located at one end of the counter-ring, the counter-ring outer surface extending radially relative to the shaft longitudinal axis;
an annular member comprising a first annular member outer surface portion and a second annular member outer surface portion located opposite the first annular member outer surface portion, the first annular member outer surface portion facing in a direction of the counter-ring outer surface, the first annular member outer surface portion being in direct contact with the counter-ring outer surface, the annular member and the shaft defining a gap, wherein the annular member is located at a spaced location from the shaft, the counter-ring being located between the shaft ring and the annular member, the second annular member outer surface portion facing in a direction of the pump casing, the second annular member outer surface portion being located at a spaced location from the pump casing, the second annular member outer surface portion extending radially relative to the shaft longitudinal axis.

18. A multi-stage centrifugal pump according to claim 17, wherein the pump casing is located at spaced location from the shaft.

19. A multi-stage centrifugal pump according to claim 18, wherein a portion of the pump casing and the shaft define another gap, wherein a dimension of the gap is less than a dimension of the another gap.

20. A multi-stage centrifugal pump according to claim 17, wherein the pump casing comprises at least one pump casing projection, the annular member being movably mounted to the at least one pump casing projection such that the annular sheet metal section is movable relative to the at least one pump casing projection via the pressure in the pump, the annular member surrounding the shaft.

* * * * *